April 7, 1942.   D. J. LODER ET AL   2,278,550
PREPARATION OF ALKALI METAL ALKOXIDES
Filed June 21, 1939
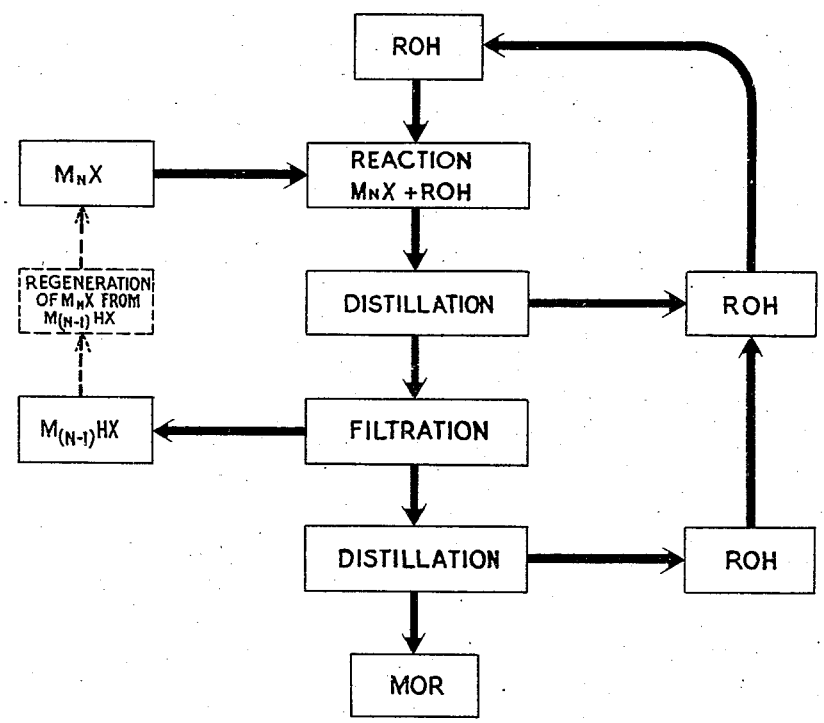
M — represents an alkali metal
N — represents a number from 2 to 3
R — represents an alkyl group
X — represents the anion of a weak acid
Donald D. Lee
Donald J. Loder   INVENTORS
BY  
ATTORNEY Patented Apr. 7, 1942

2,278,550

UNITED STATES PATENT OFFICE 2,278,550

PREPARATION OF ALKALI METAL ALKOXIDES

Donald J. Loder and Donald D. Lee, Wilmington, Del., assignors to E. I. du Pont de Nemours & Company, Wilmington, Del., a corporation of Delaware Application June 21, 1939, Serial No. 280,308

16 Claims. (Cl. 260—632)

The invention relates to improvements in the manufacture of metal alkoxides and more particularly to the preparation of alkali metal alkoxides by the interaction of alcohols with alkali metal salts of weak acids.

Alkali metal alkoxides have been prepared by direct reaction of the alkali metal as such with an alcohol or by action of an alkali metal hydroxide upon an alcohol. The higher cost of the first of these methods has limited somewhat the industrial use of the alkoxide thus prepared and much effort has been expended in endeavors to make the second more commercially practicable. In spite of a number of improvements, the latter process has not been given full commercial acceptance due to problems resulting from the incomplete character of the reaction.

An object of the present invention is to provide improved processes for the preparation of alkali metal alkoxides, which processes have eliminated many of the difficulties inherent in the processes known prior to the invention. Another object is to provide a process for the preparation of the alkali metal alkoxides by the reaction of an alkali metal salt of a weak acid with an alcohol. Yet another object is to provide a process for the preparation of alkali metal alkoxides by the interaction of alkali metal salts of weak acids with alcohols, which reaction gives, together with the alkali metal alkoxides, a salt which is relatively insoluble in and readily separable from the alcohol. Still another object is to provide a process wherein alkali metal alkoxides are prepared by interacting alkali metal salts of weak acids with alcohols, which reaction gives, together with the alkali metal alkoxide, a gaseous reaction product. A further object is to provide a process for the interaction of an alkali metal salt of a weak acid with an alcohol in which the salt is soluble and thereby producing the corresponding alkali metal alkoxide. Other objects and advantages of the invention will hereinafter appear.

The above and other objects may be realized by dissolving an alkali metal salt of a weak acid in an alcohol until a saturated solution is obtained, and when equilibrium has been substantially established between the solid and liquid phases and the reaction is substantially complete, filtering the resulting mixture, separating from the filtrate the undissolved alkali metal salts and recovering the alkali metal alkoxide from the filtered solution. The reaction may be conducted in accord with the following equations:

1. $M_2X + ROH = MOR + MHX$
2. $M_3X + ROH = MOR + M_2HX$

M is an alkali metal ion, $X-$, $X=$, or $X\equiv$ (see equations below for use of $X-$) are the anions of weak acids which may or may not be volatile, and R is an alkyl, or aralkyl radical which may be saturated, unsaturated, substituted or unsubstituted.

In Reactions 1 and 2, an alkali metal salt of a weak acid is digested with an alcohol at an appropriate temperature, the digestion being continued until equilibrium has been substantially reached. The equilibrium mixture is filtered for the separation of any undissolved ($M_2X$ or $M_3X$) salt and the resulting solution (or filtrate) is found to contain an alkali metal alkoxide, or aralkoxide, (MOR) hereinafter called "alkoxides," as well as small amounts of the ($M_2X$ and $M_3X$) salts which have not reacted and traces of the corresponding alkali metal acid salts (MHX and $M_2HX$). Substantially all of the ($M_2X$, $M_3X$, MHX, and $M_2HX$) salts can be precipitated from the solution by concentration, which may be effected by simple distillation of a portion of the alcohol present therein.

Specific examples of Reactions 1 and 2 for the preparation of potassium methoxide, sodium methoxide and sodium glycolyloxide proceed in accord with the following equations:

1a. $K_2CO_3 + CH_3OH = KOCH_3 + KHCO_3$
1b. $NA_2S + CH_3OH = NaOCH_3 + NaHS$
2a. $Na_3PO_4 + CH_2OHCH_2OH =$
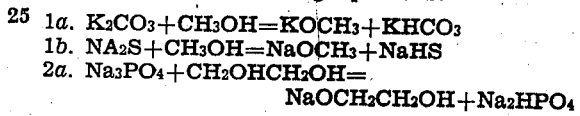
$NaOCH_2CH_2OH + Na_2HPO_4$ The reactions described can be forced to the right, in accord with the known laws of mass action, by removal of the alkali metal alkoxide (MOR), or the acid salt (MHX or $M_2HX$). By this means it is possible to obtain concentrations of the "alkoxides" in excess of those resulting from equilibrium conditions such as are indicated by the equations. This effect may, for example, be realized by continuously extracting a solid alkali metal salt with an alcohol at the appropriate temperature. The extract, containing the "alkoxide," alkali metal salt and alkali metal acid salt, is concentrated by distilling off a portion of the alcohol whereupon the alkali metal acid salt precipitates and is removed by filtration. (For continuous operation of the process this precipitate may be returned to the extraction stage.) During the concentration step it has been found that the small amount of alkali metal acid salt present reacts with an equivalent amount of the "alkoxides" to produce the normal alkali metal salt ($M_2X$ or $M_3X$) and the alcohol, which reaction is the reverse of Reactions 1 and 2. The distilled alcohol may, if desired, be returned to the extraction stage. This cyclical process is continued until the concentration of the "alkoxides" in the extract has reached the desired figure, preferably the concentration of a solution saturated at room temperature or a temperature which is most suitable for handling the solution during subsequent operations, or the extract may be distilled to completely remove the alcohol, leaving the solid "alkoxides." The attached drawing, in the form of a flow sheet, illustrates the flow of materials with especial reference to a continuous process. The alkali metal acid salt, which is filtered out, may be reused as such, if desired, while in the case of the carbonates, the acid carbonate may be calcined to produce the corresponding normal carbonate, water, and carbon dioxide.

The equilibria of Reactions 1 and 2 are shifted by the removal of the salt formed from the zone of the reaction. Another class of reactions covered by the present invention will now be discussed wherein the equilibrium is forced to the right by the removal from the reaction mixture of a gaseous product. These reactions may be designated by the following chemical formulas:

3. $MX + ROH = MOR + HX \uparrow$
4. $M_2CO_3 + 2ROH = 2MOR + H_2O \uparrow + CO_2 \uparrow$ M, X, and R have the same designations as they have in Equations 1 and 2.

In accord with the Equations 3 and 4 a solid alkali metal salt of a weak acid, which salt will hydrolyze to give a volatile acid, under reaction conditions, is mixed with an alcohol and heated to the boiling point of the mixture, whereupon the acid, formed by the reaction of the salt with the alcohol, distills off leaving unreacted alkali metal salts and "alkoxides." In lieu of a salt of a weak acid giving a volatile acid, a salt may be used which gives an acid that is substantially insoluble in the reaction medium. When conducted in this manner it is difficult to separate the acid formed from the metal alkoxide and, accordingly, this process is most useful when the mixture of metal alkoxide and acid can be employed for catalyzing the same reaction or at least for reactions in which the acid has no undesirable effect. The solution is concentrated by distillation with simultaneous removal of part or all of the alkali metal salt by filtration. In those cases such, for example, as Reaction 4b, below, the metal alkoxide is insoluble in the alcohol and may be recovered by filtration, while in case 4a the carbonic acid formed decomposes into water and carbon dioxide during the reaction and are removed in the vapor phase. The equations which follow illustrate specific examples of Reactions 3 and 4:

3a. $NaCN + CH_2OHCH_2OH = NaOCH_2CH_2OH + HCN$

4a. $K_2CO_3 + 2CH_2OHCH_2OH = 2KOCH_2CH_2OH + H_2O + CO_2$

4b. $K_2CO_3 + 2CH_3OCH_2CH_2OH = 2KOCH_2CH_2OCH_3 + H_2O + CO_2$

Yet another class of reactions involving similar principles may be designated by the following chemical formula:

5. $MRCO_3 + R'OH = MOR' + ROH \uparrow + CO_2 \uparrow$

For meaning of M, X and R, see above. R' may be an alkyl, or aralkyl radical which may be similar or dissimilar to R. This general class of reactions may be specifically illustrated by the equation:

5a. $NaCH_3CO_3 + CH_3OH \cdot CH_2OH = NaOCH_2CH_2OH + CH_3OH \uparrow + CO_2 \uparrow$ $HCH_3CO_3$ is a weak acid which is unstable and readily decomposes into $CH_3OH + CO_2$ at ordinary temperatures.

The reactions designated above may be carried out under reduced pressures or pressures in excess of atmospheric ranging generally from 10 mm. mercury pressure to 5 atmospheres or more, although the reaction is preferably conducted at 1 atmosphere pressure. The temperatures of the reactions are determined in large measure by the particular alkali metal salt and alcohol to be reacted. Generally, however, it may be stated that the following temperatures are best suited for the reactions designated:

| Temperature range | Reaction | Preferred °C. |
|---|---|---|
| 0°–100° C | 1a | 15–25 |
| 0°–100° C | 1b | 65–70 |
| 50°–200° C | 2a | 100–150 |
| 100°–200° C | 3a | 170–200 |
| 100°–200° C | 4a | 190–210 |
| 100°–200° C | 4b | 120–125 |
| 100°–130° C | 5a | 195–205 |
| 100°–220° C | | |

Reactions 3a, 4a, 4b, and 5a are preferably carried out at the boiling point of the mixture, the preferred temperature being from 0 to 10° C. above the normal boiling point of the particular alcohol used.

In addition to potassium carbonate, already designated as suitable for Reaction 1a, lithium carbonate ($Li_2CO_3$), rubidium carbonate ($Rb_2CO_3$), and caesium carbonate ($Cs_2CO_3$) may be employed, to prepare "alkoxides" by reaction of the salts with methanol, ethanol, propanol, ethylene glycol, propylene glycol, and benzyl alcohol.

In Reaction 1b, lithium sulfide ($Li_2S$), potassium sulfide ($K_2S$), rubidium sulfide ($Rb_2S$) and caesium sulfide ($Cs_2S$) may be used in lieu of sodium sulfide and these sulfides may be reacted with the alcohols designated above for Reaction 1a.

In Reaction 2a, lithium phosphate ($Li_3PO_4$), potassium phosphate ($K_3PO_4$), rubidium phosphate ($Rb_3PO_4$) and caesium phosphate ($Cs_3PO_4$) may be used as well as sodium phosphate to react with the glycols.

Reaction 3a may be conducted with lithium cyanide (LiCN), potassium cyanide (KCN), rubidium cyanide (RbCN), caesium cyanide (CsCN), calcium cyanide ($Ca(CN)_2$) and barium cyanide ($Ba(CN)_2$) in place of the sodium cyanide designated above, in the specific formula given. The alcohol used in this reaction should, for atmospheric pressure reactions, preferably have a boiling point in excess of 100° C., although if the reaction is conducted under elevated pressures alcohols which boil below 100° C. may be used. There are included for use in this reaction the aliphatic monohydric alcohols such, for example, as N-propyl, N-butyl, isobutyl and the higher straight and branch chain saturated and unsaturated monohydric alcohols, and the polyhydric alcohols such as ethylene glycol, propylene glycol, glycerol, etc.

In Reactions 4a, and 4b any alkali metal or alkaline earth metal carbonate may be employed, such as sodium carbonate ($Na_2CO_3$), barium carbonate ($BaCO_3$), magnesium carbonate ($MgCO_3$) in place of the potassium carbonate designated in the specific formulas given. Furthermore, these alkali metal salts may be reacted with any aliphatic monohydric alcohols such as methanol, ethanol, the propanols, the butanols and the like; the glycols, such as ethylene glycol, propylene glycol and benzyl alcohol. Preferably the alcohol should boil above 100° C. but will be suitable if it can be made to boil above that temperature under the elevated pressures of the reaction and has a definite solvent power for the carbonate used. This reaction is preferred for the preparation of the alkali metal alkoxide from ethylene glycol, ethylene glycol monomethyl ether and propylene glycol having the solubilities designated.

The process is generally applicable to the preparation of "alkoxides" from alcohols and metal salts of weak acids. One of the primary requisites of a successful reaction is that the metal salt is soluble in the alcohol, the alkyl group of which is to form a part of the "alkoxide." This solubility need not be great, for the reaction will proceed satisfactorily if from 0.0001 to 1.0 part of the metal salt will dissolve per part the alcohol. It may, therefore, be generally stated that metal alkoxides and more particularly alkali metal alkoxides can be prepared from all metal salts and especially alkali metal salts which are soluble in the alcohol.

At least 1 mole of the mono or polyhydric alcohol per mole of salt should be employed, although more than 1 mole of the alcohol per mole of the salt will facilitate handling since the concentrated solutions tend to be viscous or gelatinous and are difficult to handle.

The more detailed practice of the invention is illustrated by the following examples in which parts given are by weight unless otherwise stated. There are, of course, many forms of the invention other than these specific embodiments.

*Example 1*

A. $K_2CO_3 + CH_3OH = KOCH_3 + KHCO_3$ (solid)

Potassium methoxide was prepared by a single extraction process wherein 8.6 parts of $K_2CO_3$ and 94.6 parts of $CH_3OH$ were reacted at 20° C. for 6 hours. A solution containing 2.9 parts of $KOCH_3$, 0.9 part of $KHCO_3$, 2.9 parts of $K_2CO_3$ and 93.3 parts of $CH_3OH$ was obtained. 3.2 parts of solid $KHCO_3$ precipitated from this solution. After filtering the $KHCO_3$ from the reaction mixture, the remaining carbonates were separated by evaporating the methanol from solution whereupon the carbonates precipitated and were readily filtered from the saturated potassium methoxide solution. This latter solution may be further evaporated to give solid potassium methoxide.

B. A continuous extraction process may be employed wherein methanol is allowed to trickle at 15° to 25° C., through an extraction chamber containing potassium carbonate. The extract flows into a distillation vessel from which the methanol is distilled at a temperature between 65° and 105° C. and the methanol being returned to the extraction chamber. This cycle is repeated and as the concentration of $K_2CO_3$ in the distillation vessel passes the saturation point this salt will precipitate and may be filtered from the other products. The precipitate, if desired, may be continuously returned to the extraction column. The potassium methoxide may be separated from the methanol and small amounts of potassium carbonate, after removing sufficient methanol by distillation to give a saturated solution of potassium methoxide, the carbonate being separated by filtration and the remaining methanol being removed by distillation to leave the solid potassium methoxide. By such a process it has been found that 1.97 parts of potassium carbonate could be extracted by 2.02 parts of methanol to give a solution containing 1 part of potassium methoxide and 1.56 parts of methanol, 1.43 parts of potassium acid carbonate precipating from solution in the extraction chamber.

*Example 2*

$Na_2S + CH_3OH = NaOCH_3 + NaHS$ (solid)

Sodium methoxide is prepared by reacting 21.7 parts of anhydrous $Na_2S$ and 78.3 parts of methanol which will give a solution containing 4.2 parts of $NaOCH_3$, 1.9 parts of $NaHS$, 15.6 parts of $Na_2S$ and 78.3 parts of $CH_3OH$ at a temperature of approximately 62° C. 2.5 parts of solid anhydrous $NaHS$ precipitates from such a solution and the remaining 1.9 parts of $NaHS$ and the 15.6 parts of $Na_2S$ are precipitated from the solution by concentration in a manner similar to that disclosed in Example 1A.

*Example 3*

$Na_3PO_4 + CH_2OH.CH_2OH =$
$NaOCH_2CH_2OH + Na_2HPO_4$ (solid)

10.8 parts of anhydrous $Na_3PO_4$ and 93.2 parts of ethylene glycol, $CH_2OH.CH_2OH$ are reacted at a temperature of approximately 100° C. to give a reaction mixture containing 4 parts of solid $Na_2HPO_4$ and 100 parts of a solution containing 2.7 parts of $NaOCH_2.CH_2OH$, 0.6 part of $Na_2HPO_4$, 5.5 parts of $Na_3PO_4$ and 91.2 parts of $CH_2OH.CH_2OH$. The sodium glycolyl oxide is separated from the reaction mixture in a manner analogous to the process disclosed above in Example 1.

*Example 4*

$NaCN + CH_2OHCH_2OH =$
$NaOCH_2CH_2OH + HCN$ (gas)

4.78 parts of NaCN are reacted with 95.6 parts of ethylene glycol, $CH_2OH.CH_2OH$. The reaction mixture is, in the discontinuous process refluxed for approximately 2 hours at 200° C., whereupon there is obtained a solution containing 0.99 part of $NaOCH_2.CH_2OH$, 4.2 parts of NaCN and 94.8 parts of $CH_2OH.CH_2OH$. 0.33 part of HCN gas is evolved during the reaction.

*Example 5*

$K_2CO_3 + 2CH_2OHCH_2OH = 2KOCH_2CH_2OH + H_2O \uparrow + CO_2 \uparrow$

This reaction may be conducted by the single extraction or continuous extraction process of Example 1. It has been found that 17 parts of $K_2CO_3$ and 86.8 parts of glycol refluxed for 12 hours at 200° C. give as the products 1.1 parts of water, 2.7 parts of $CO_2$ (the water and $CO_2$ are vaporized during the reaction) and 100 parts of a solution containing 12.3 parts of $KOCH_2.CH_2OH$, 8.5 parts of $K_2CO_3$ and 79.2 parts of glycol. The potassium glycolyl oxide may be recovered in accord with the method described above in Example 1.

*Example 6*

$K_2CO_3 + 2CH_3OCH_2CH_2OH = 2KOCH_2CH_2OCH_3 + H_2O \uparrow + CO_2 \uparrow$

A mixture containing 9.7 parts of $K_2CO_3$ and 97.8 parts of $CH_3OCH_2.CH_2OH$ are refluxed at a temperature of 125° C. for approximately 4½ hours. The products obtained were 0.5 part of water, 1.1 parts $CO_2$ (which vaporized during the reaction), 5.8 parts of solid $KOCH_2CH_2OCH_3$ and 100 parts of a solution containing 6.2 parts of $K_2CO_3$ and 93.8 parts of $CH_3OCH_2CH_2OH$. The solid $KOCH_2CH_2OCH_3$ may be filtered directly from the resulting product.

*Example 7*

$NaCH_3CO_3 + CH_2OHCH_2OH =$
$NaOCH_2CH_2OH + CH_3OH + CO_2$ 17.1 parts of $NaCH_3CO_3$ were reacted with 97.4 parts of $CH_2OH.CH_2OH$ at 200° C. for 4 hours. 100 parts of the solution obtained contained 3.39 parts of $NaOCH_2.CH_2OH$, 1.69 parts of $Na_2CO_3$, and 94.92 parts of $CH_2OH.CH_2OH$. 5.6 parts of a solid were likewise obtained which contained in addition 0.45 part of $NaOCH_2.CH_2OH$ and 5.15 parts of $Na_2CO_3$. 4.7 parts of $CO_2$, 2.9 parts of $CH_3OCH_3$ and 1.4 parts of $CH_3OH$ distilled off during the reaction.

The "alkoxides" are used as catalysts for various reactions such, for example, as ester condensations and addition of CO to alcohols to form alkyl formates, and to ammonia and addition of CO to alcohols to form alkyl formates, and to ammonia and amines to form formamides.

From a consideration of the above specification it will be appreciated that many changes may be made in the details therein given without departing from the scope of the invention or sacrificing any of the advantages that may be derived therefrom.

We claim:

1. A process of preparing an alkali metal alcoholate which comprises reacting an alkali metal salt of a weak acid with an alcohol in which the salt is soluble and recovering the metal alcoholates from the reaction products in accord with the equation: $M_2X+ROH=MOR+MHX$; M is an alkali metal ion, X is the anion of a weak acid and R is a radical selected from the group consisting of alkyl, and aralkyl radicals.

2. A process of preparing an alkali metal alcoholate which comprises reacting an alkali metal salt of a weak acid with an alcohol in which the salt is soluble and recovering the metal alcoholate from the reaction products in accord with the equation: $M_2X+ROH=MOR+M_1HX$ in which M is an alkali metal ion, X is the anion of a weak acid and R is a radical of the group consisting of alkyl, and aralkyl radicals.

3. A process of preparing an alkali metal alcoholate which comprises reacting an alkali metal salt of a weak acid and an alcohol in which the salt is soluble and recovering the metal alcoholate from the reaction products in accord with the equation: $MX+ROH=MOR+HX$ in which M is an alkali metal ion, X is the anion of a weak acid and R is a radical of the group consisting of alkyl; and aralkyl radicals and HX is volatile at reaction temperatures.

4. A process of preparing an alkali metal alkoxide which comprises reacting an alkali metal salt of a weak acid with an alcohol in which the salt is soluble and recovering the alkali metal alkoxide from the reaction products.

5. A process of preparing a potassium alkoxide which comprises reacting the potassium salt of a weak acid with an alcohol in which the salt is soluble and from which resulting solution the potassium acid salt of the weak acid formed by the reaction is crystallizable and recovering the potassium alkoxide from the reaction mixture.

6. A process of preparing an alkali metal alkoxide which comprises reacting an alkali metal salt of a weak acid with an alcohol in which the salt is soluble and from which resulting solution the alkali metal acid salt of the weak acid formed by the reaction is crystallizable and recovering the alkali metal alkoxide from the reaction mixture.

7. A process of preparing an alkali metal alkoxide which comprises reacting an alkali metal salt of a weak acid with an alcohol which will dissolve at least 0.0001 part of the salt per part of the alcohol, from which resulting solution the alkali metal acid salt of the weak acid is crystallizable and recovering the alkali metal alkoxide from the reaction product.

8. A process of preparing a potassium alkoxide which comprises extracting potassium salt of a weak acid with an alcohol in which the salt is soluble, concentrating the extract to precipitate the potassium salts contained therein and subsequently recovering the potassium alkoxide from the extracted product.

9. A process of preparing an alkali metal alkoxide which comprises heating to its boiling point a solution containing an alkali metal salt of a weak acid and an alcohol which, under the conditions of the reaction, boils at approximately 100° C. and subsequently recovering from the reaction product the metal alkoxide formed.

10. A process of preparing an alkali metal alkoxide which comprises heating to its boiling point a mixture containing an alkali metal salt of a weak acid and an aliphatic monohydric alcohol in which the salt is soluble, which alcohol boils above 100° C. under the conditions of the reaction, and subsequently recovering from the reaction product the alkali metal alkoxide formed.

11. A process of preparing a potassium alkoxide which comprises extracting a potassium salt of a weak acid with an alcohol in which the salt is soluble, concentrating the extract to precipitate the potassium salts contained therein and subsequently recovering the potassium alkoxide from the extracted product.

12. A process for the preparation of potassium methoxide which comprises extracting potassium carbonate with methanol, concentrating the extract, separating the potassium carbonate present by filtration and recovering potassium methoxide.

13. A process for the preparation of sodium methoxide which comprises extracting sodium sulfide with methanol, concentrating the extract to separate the sodium sulfide contained therein and recovering sodium methoxide.

14. A process for the preparation of potassium glycolyloxide which comprises heating to its boiling point potassium carbonate and ethylene glycol and recovering from the reaction product the potassium glycolyloxide formed.

15. A process for the preparation of potassium methoxide which comprises saturating methanol with potassium carbonate, heating the saturated solution, separating the potassium acid carbonate formed and the potassium carbonate unreacted from the solution and recovering the potassium methoxide from the substantially potassium carbonate and potassium acid carbonate free solution.

16. A process for the preparation of potassium alkoxide which comprises reacting the potassium salt of a weak acid with an alcohol in which it is soluble.

DONALD J. LODER.
DONALD D. LEE.